(No Model.) 8 Sheets—Sheet 1.

S. S. WILLIAMSON.
APPARATUS FOR SHAPING DRESS SHIELDS.

No. 499,271. Patented June 13, 1893.

WITNESSES:
J. F. Finch.
R. C. Ambler

INVENTOR
S. S. Williamson
BY
F. W. Smith Jr.
ATTORNEY (No Model.) 8 Sheets—Sheet 5.
S. S. WILLIAMSON.
APPARATUS FOR SHAPING DRESS SHIELDS.
No. 499,271. Patented June 13, 1893.

WITNESSES:
INVENTOR
ATTORNEY (No Model.) 8 Sheets—Sheet 6.

S. S. WILLIAMSON.
APPARATUS FOR SHAPING DRESS SHIELDS.

No. 499,271. Patented June 13, 1893.

WITNESSES:
J. F. Finch.
R. C. Ambler.

INVENTOR
S. S. Williamson
BY F. W. Smith Jr.
ATTORNEY (No Model.) 8 Sheets—Sheet 7.
S. S. WILLIAMSON.
APPARATUS FOR SHAPING DRESS SHIELDS.
No. 499,271. Patented June 13, 1893.
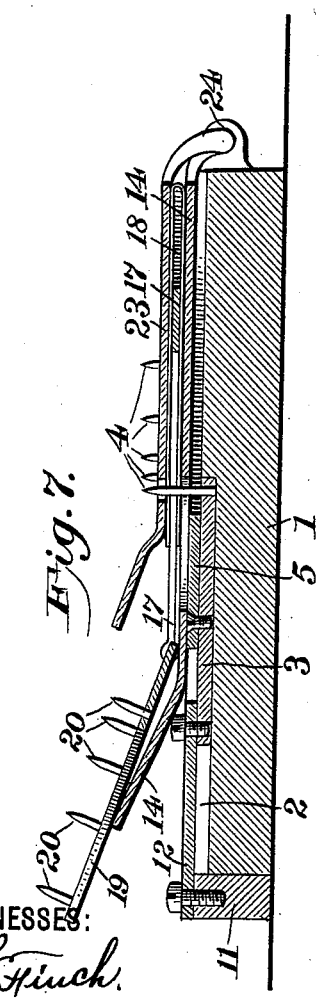
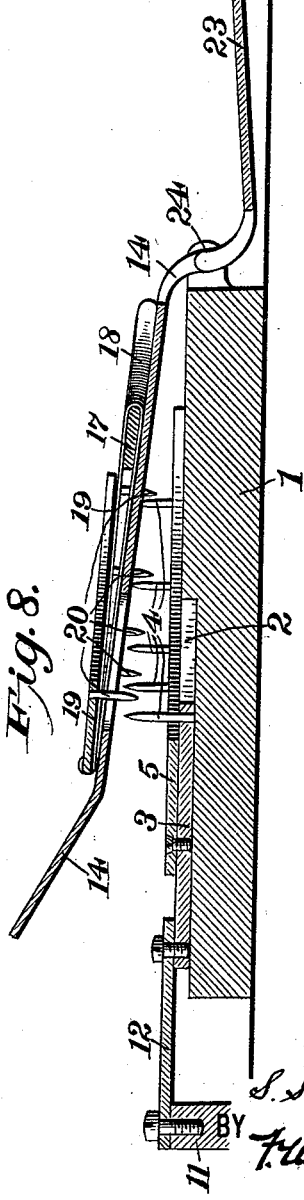
WITNESSES:
J. F. Finch.
R. C. Ambler.
INVENTOR
S. S. Williamson
BY
F. W. Smith Jr.
ATTORNEY (No Model.) 8 Sheets—Sheet 8.
S. S. WILLIAMSON.
APPARATUS FOR SHAPING DRESS SHIELDS.
No. 499,271. Patented June 13, 1893.
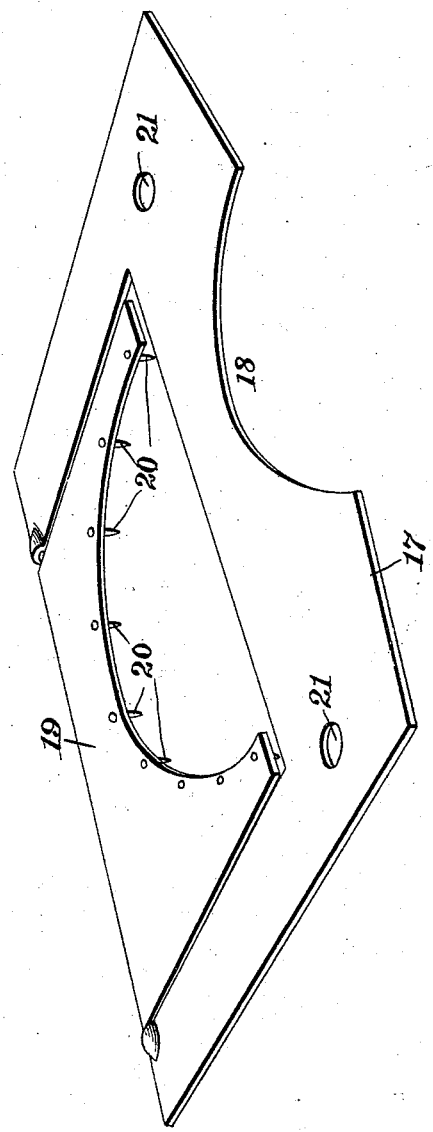
WITNESSES:
INVENTOR
ATTORNEY

UNITED STATES PATENT OFFICE.

SAMUEL S. WILLIAMSON, OF BRIDGEPORT, CONNECTICUT.

APPARATUS FOR SHAPING DRESS-SHIELDS.

SPECIFICATION forming part of Letters Patent No. 499,271, dated June 13, 1893.

Application filed June 8, 1891. Renewed November 16, 1892. Serial No. 452,173. (No model.)

*To all whom it may concern:*

Be it known that I, SAMUEL S. WILLIAMSON, a citizen of the United States, residing at Bridgeport, in the county of Fairfield and State of Connecticut, have invented certain new and useful Improvements in Apparatus for Shaping Dress-Shields; and I do hereby declare the following to be a full, clear, and exact description of the invention, such as will enable others skilled in the art to which it appertains to make and use the same.

My invention relates to certain new and useful improvements in apparatus for manufacturing seamless dress-shields, but more particularly has reference to certain means whereby the shields are stretched into proper shape on suitable forms, the latter being then removed for the purpose of vulcanizing the shields.

Figure 1:
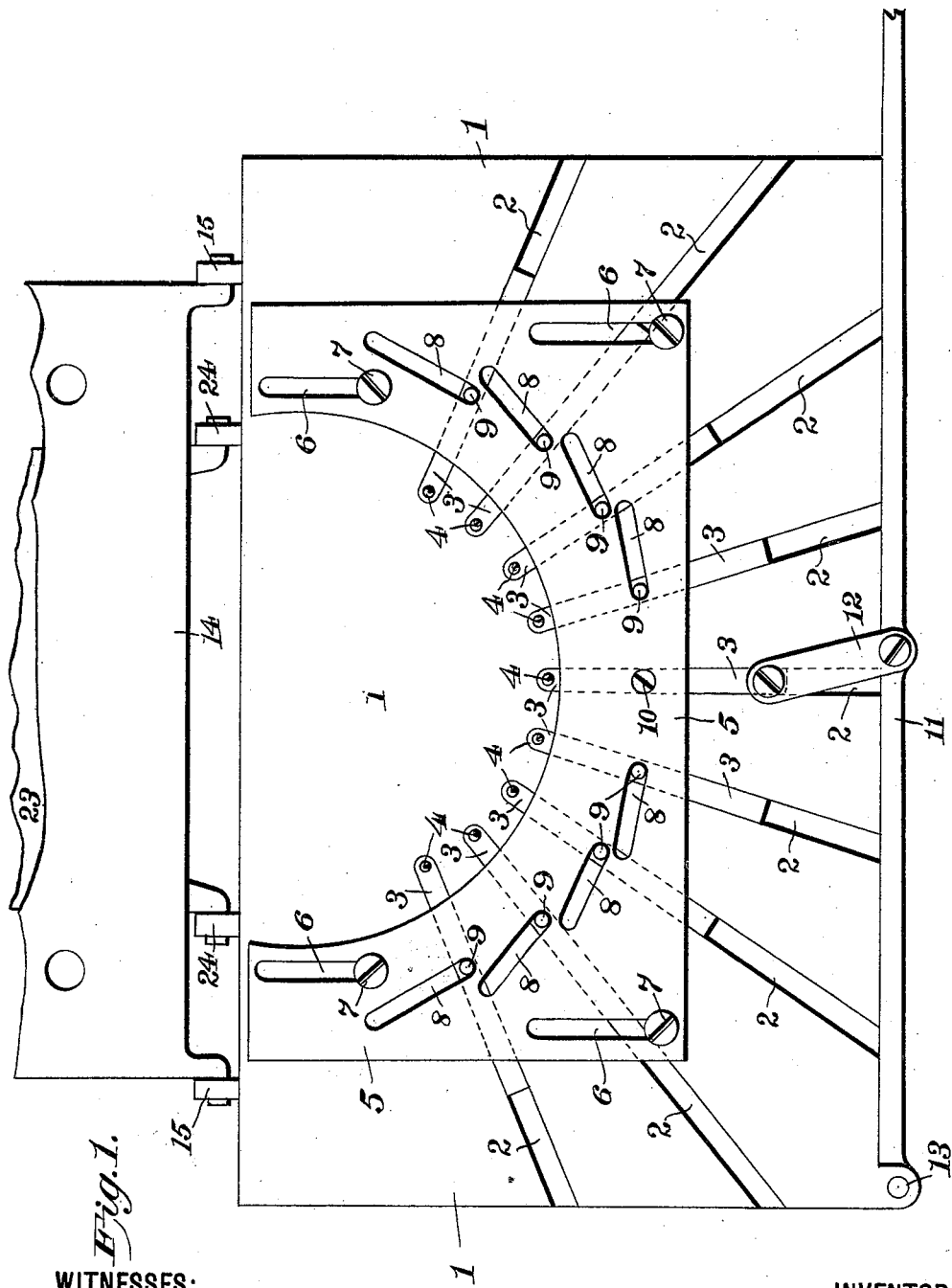
Figure 2:
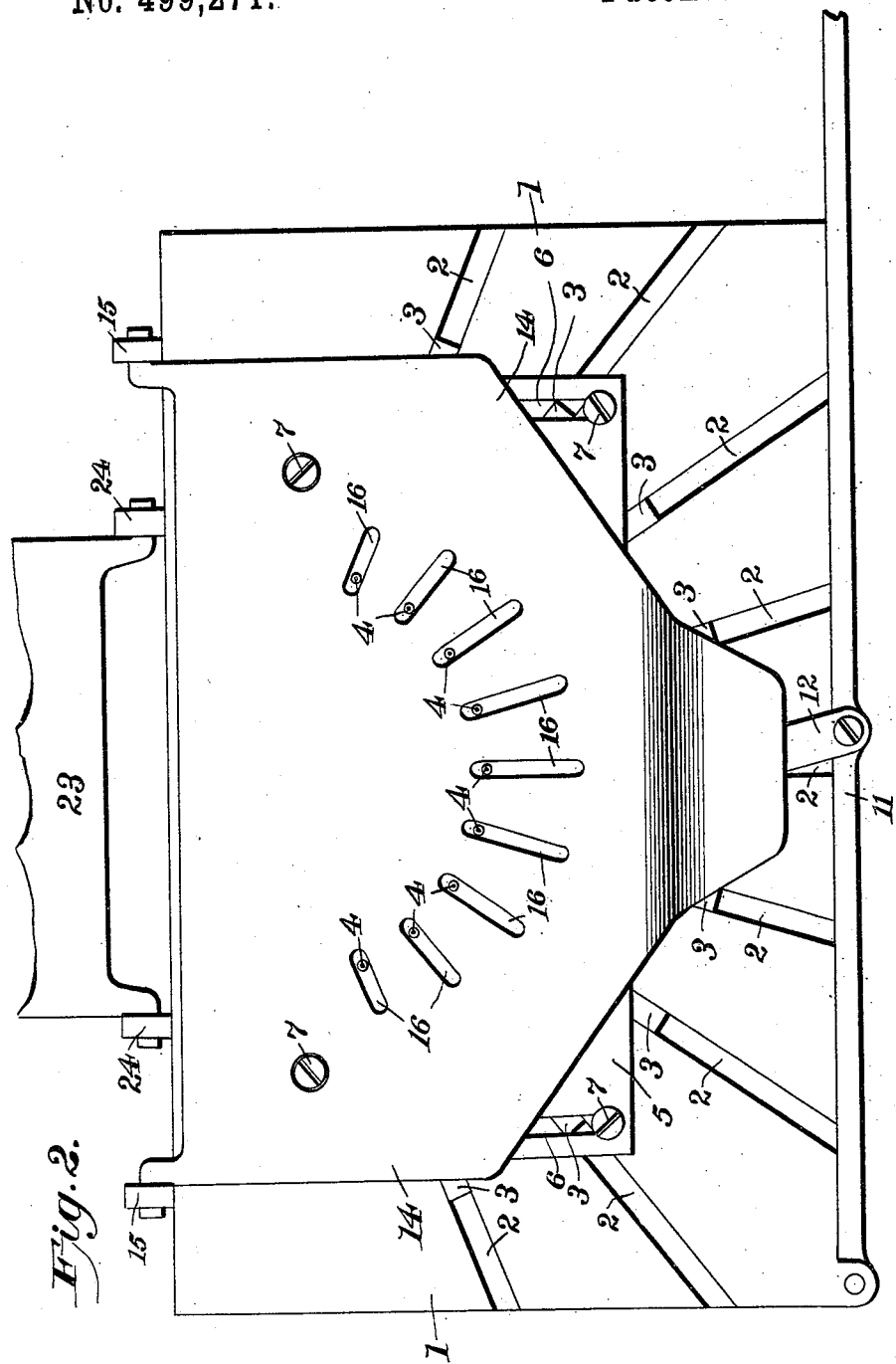
Figure 3:
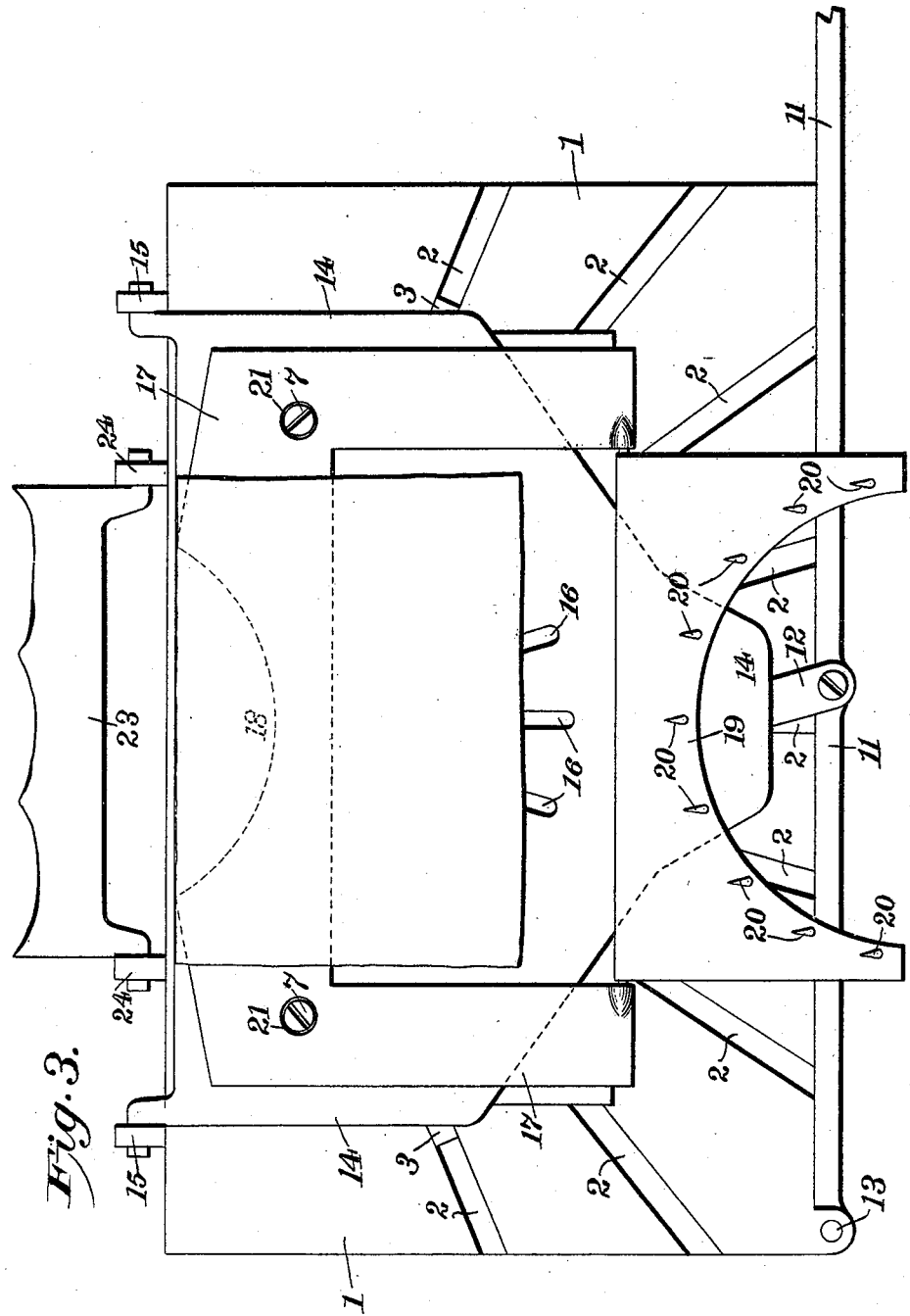
Figure 4:
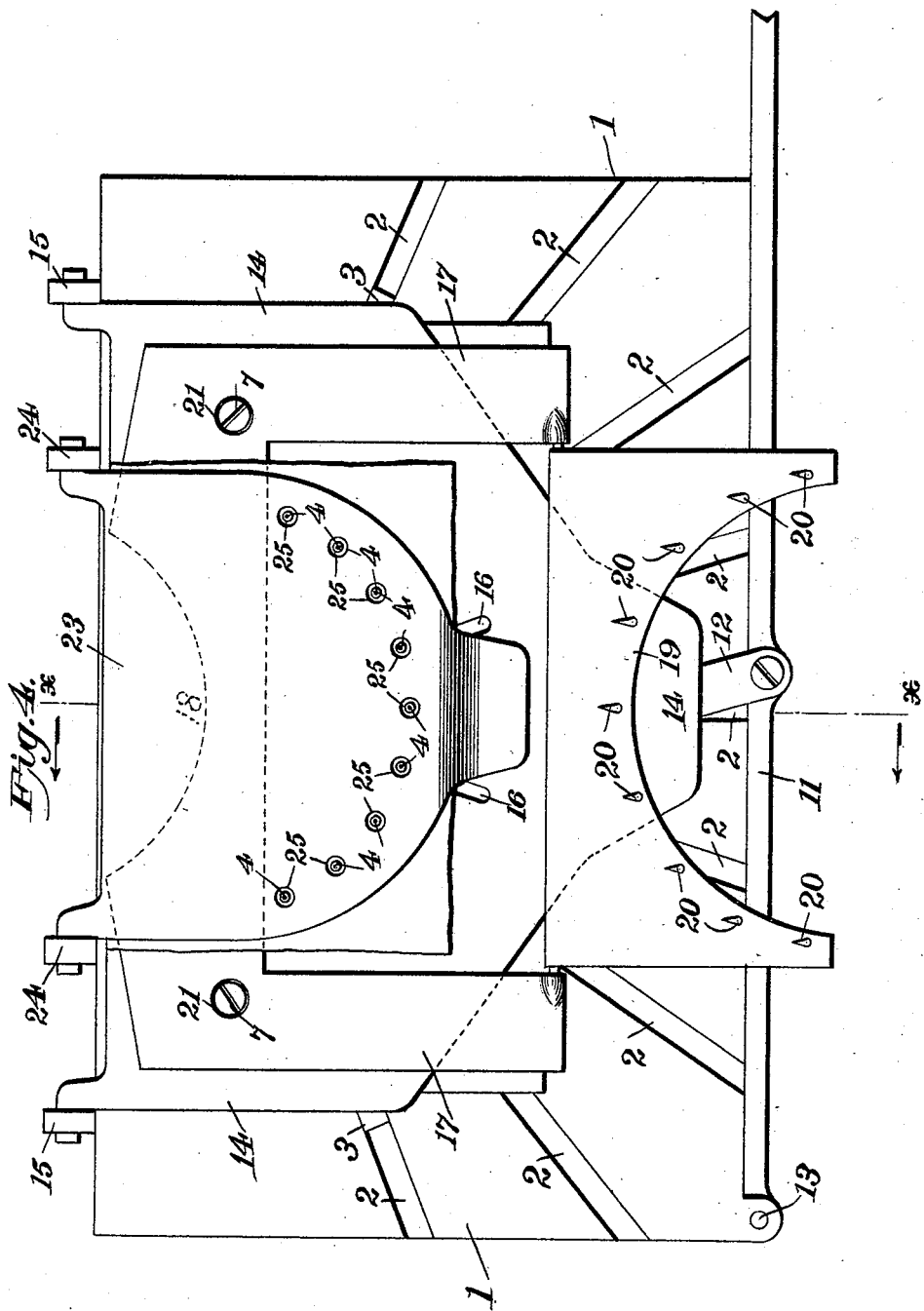
Figure 5:
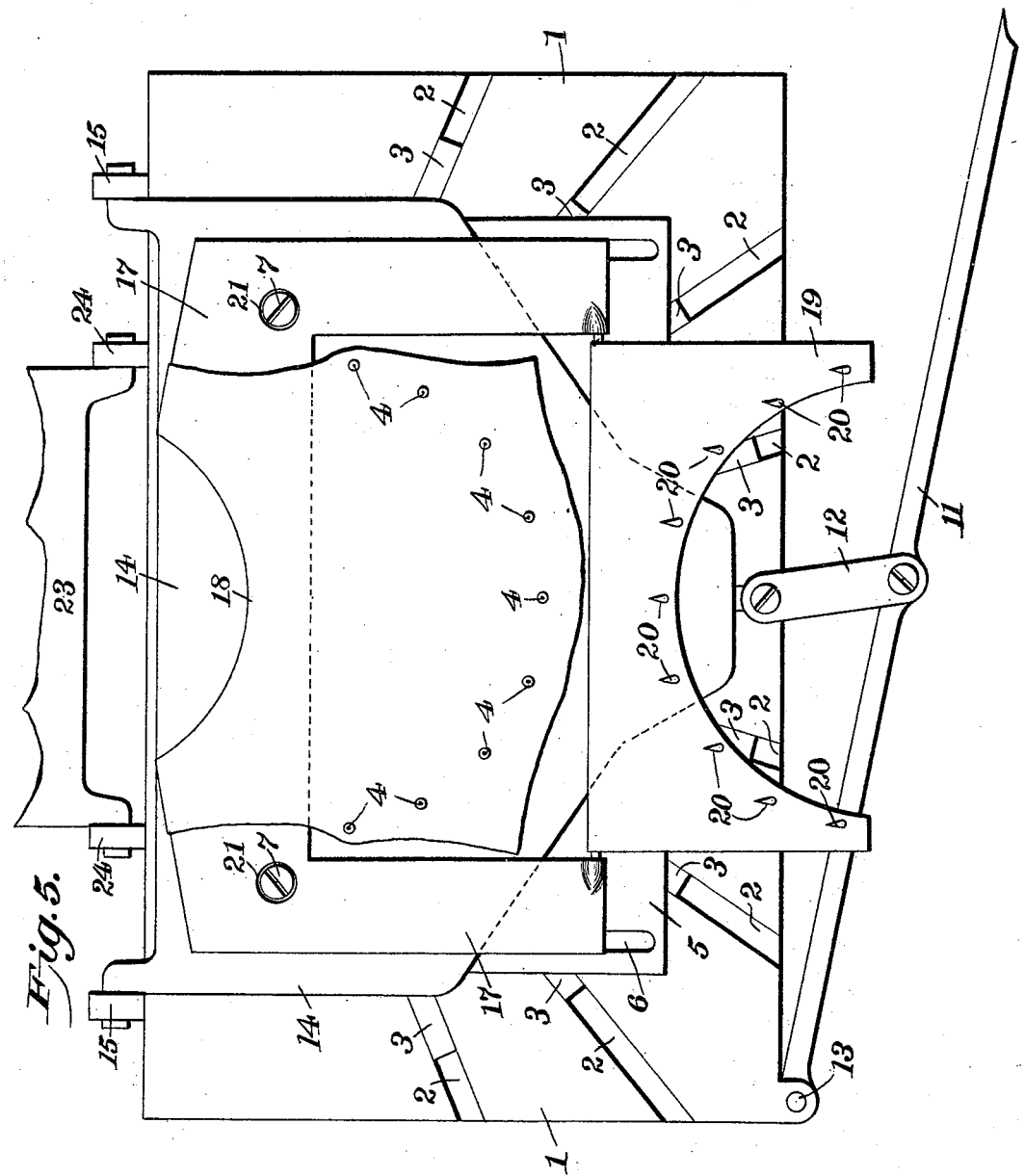
Figure 6:
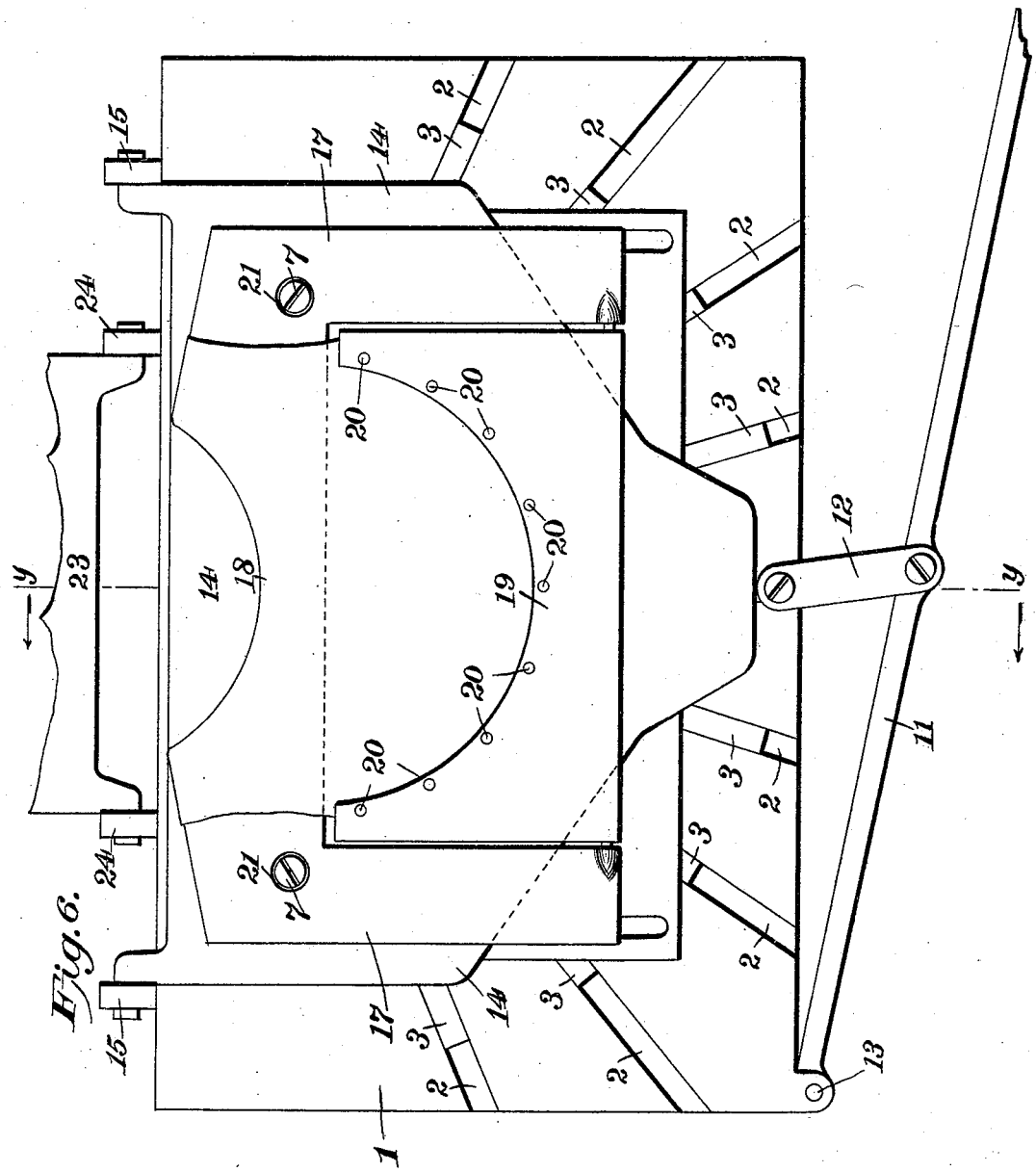

In the accompanying drawings,—Figure 1 is a plan of the stretcher-bars and stretcher-plate in proper position on the bed, the pinning-on leaf and stripper being shown broken away and thrown backward; Fig. 2, a similar view with the exception that the stripper is shown thrown forward upon the stretcher-plate; Fig. 3, a plan showing a form and a piece of material from which a shield may be made in proper position with respect to my improved apparatus; Fig. 4, a view similar to Fig. 3, with the exception that in the former the pinning-on leaf is shown thrown forward upon the material to fasten the latter to the stretching pins; Fig. 5, a view similar to Fig. 3, but showing the position of parts when the shield has been stretched; Fig. 6, a view similar to Fig. 5 but showing the lock-plate of the form thrown down upon the stretched shield to hold the latter in its stretched shape, so that the form may be removed with the shield thereon for the purpose of vulcanizing. Figs. 7 and 8 are sections at the lines *x, x*, Fig. 4, and *y, y*, Fig. 6, respectively, and Fig. 9, a detail perspective of the form.

Similar numbers denote like parts in the several figures of the drawings.

1 is the bed-plate of the apparatus having radial channels 2 therein.

3 are stretcher-bars adapted to slide freely within said channels and provided with pins 4 projecting upwardly from the outer ends thereof.

5 is a stretcher-plate on the bed 1 and having slots 6 through which screws 7 extend within the bed, whereby said plate may be properly guided.

8 are cam-slots within the plate 5 through which studs 9 project from the bars 3. These cam-slots are so formed that when the plate 5 is drawn back the bars 3 will be retracted within the channels 2. The center bar 3 is secured to the plate 5 by a screw 10, and the rear end of this bar is connected to an operating lever 11 by a link 12 whose respective ends are pivoted to said bar and lever. This lever is pivoted at 13 to the bed-plate and operates to advance and retract the stretcher-plate.

14 is a stripper pivoted within ears 15 and having elongated radial slots 16 through which the pins 4 project when said stripper is folded inward, as shown at Fig. 2.

17 is the form which is crescent-shaped at its front edge as seen at 18. At the rear of the form is a pivoted lock-plate 19 provided with pins 20 which latter pierce the stretched shield and thereby hold it in stretched condition, as will be presently set forth.

In practice the material from which the shield is made is placed on the stripper and the form deposited on said material, the latter being then doubled over the form, as will be clearly seen by reference to Fig. 3.

21 are the perforations in the form through which the latter is secured over the screws 7, as shown at Fig. 3.

23 is a pinning-on leaf pivoted to the bed between ears 24 and having perforations 25 extending in the arc of a circle.

The parts being in the position shown at Fig. 3, the leaf 23 will when folded inward force the material of the shield on the pins 4, which latter will register through the perforations 25, as shown at Fig. 4.

The material which I use in the manufacture of dress shields by my apparatus is what is known as "stockinet faced rubber," and shields made from this material must be vulcanized while in stretched condition in order that the shape may be rendered permanent.

The operation of my apparatus is as follows: The parts being in the position shown at Fig. 2, I place a suitable piece of the shield material upon the stripper in such manner that one end of the material will be in a position to be readily fastened to the pins 4, while the other end extends beyond the bed 1 and rests upon the leaf 23. The form is now placed in position upon the shield material and the latter folded over the form, as shown at Fig. 3. The leaf 23 is now folded inward to force the shield material on the pins 4, as shown at Fig. 4, and is then thrown back to normal position. The lever 11 is now operated to retract the pins 4 and stretch the material into the proper shape around the form, as shown at Fig. 5, and the lock-plate 19 is then thrown forward upon the material (the pins 20 penetrating the latter) as shown at Fig. 6. The stripper 14 is now raised to lift the shield material clear of the pins 4, as shown at Fig. 8, and the form is then removed from the apparatus and placed in any suitable vulcanizer.

There are two parts of the apparatus which I have herein described that are not essential, namely, the stripper and the pinning-on leaf, for it will be readily seen that the shield material may be forced on the pins 4 by hand, and also that the form may be raised and removed by hand from the apparatus without the aid of the stripper. I do not therefore wish to be limited to the use of said leaf and stripper.

I claim—

1. In an apparatus for shaping dress-shields, the combination of the bed and the stretcher-bars guided therein, the latter provided with upwardly projecting pins, the stretcher-plate having cam-slots, the studs projecting from said bars within said slots, means for operating said plate, and a form detachably secured to the bed over said plate and provided with means for locking the shield in stretched condition, substantially as set forth.

2. In an apparatus for shaping dress-shields, the combination with a bed and devices supported thereby for stretching the shield, of a form detachably secured on said bed and around which the shield is stretched, and means independent of said stretching devices and carried by said form for locking the shield in stretched condition, whereby the form and stretched shield may be removed from said devices preparatory to the vulcanization of the shield, substantially as shown and described.

3. In an apparatus for shaping dress shields, the combination with a form, of means for stretching the shields initially to and around said form, and means carried by the latter and independent of the stretching devices for locking the shield in stretched condition upon the form, substantially as set forth.

4. The combination of the bed having therein radial channels, the stretcher-bars adapted to slide freely within said channels and having grasping pins and studs projecting upwardly therefrom, the stretcher-plate guided on the bed and having cam-slots within which said studs project, the form removably secured to the bed and around which the shield material is placed and forced upon said pins, means for retracting the stretcher-plate whereby the shield is stretched, and the lock-plate pivoted to the form and having pins whereby the shield may be grasped and retained in stretched condition on the form, substantially as set forth.

5. The combination of the stretching devices mounted and guided on the bed, the stripper pivoted to the bed and resting in normal position upon said devices, and the form supported on said stripper, whereby the raising of the latter will lift the form thereby freeing the shield material from the stretching devices, substantially as set forth.

6. In an apparatus for shaping dress shields, the combination of the bed and the stretcher-bars guided therein, means for retracting said bars, and a form detachably secured to the bed and provided with means for locking the shield in stretched condition, substantially as set forth.

7. In an apparatus for shaping dress-shields, the combination with suitable stretching devices mounted and operated on a bed, of a form detachably secured on said bed and having a crescent-shaped front edge, and a lock-plate carried by said form and provided with pins, said plate being normally out of action but adapted to be depressed upon the form whereby the shield will be held in stretched condition, substantially as shown and set forth.

In testimony whereof I affix my signature in presence of two witnesses.

SAMUEL S. WILLIAMSON.

Witnesses:
F. W. SMITH, Jr.,
J. S. FINCH.